Sept. 27, 1932.  J. W. HILL  1,879,241
REFRIGERATED CONTAINER
Filed June 10, 1929
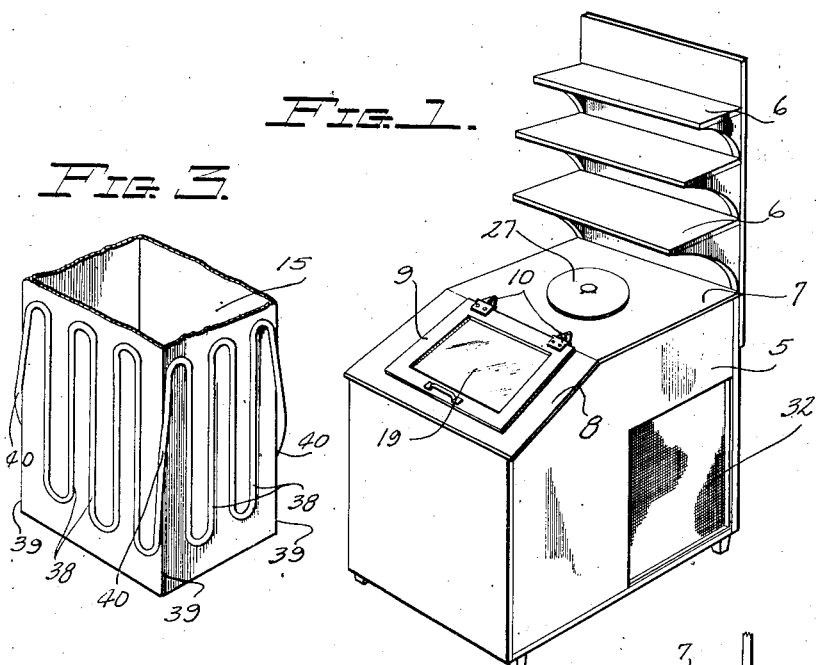
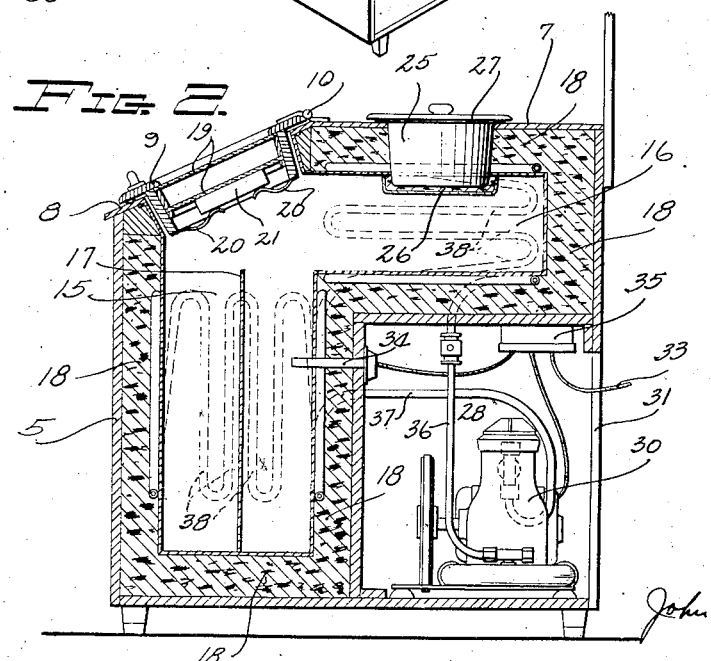
Inventor
John W. Hill
By Wheeler, Wheeler & Wheeler
Attorneys Patented Sept. 27, 1932

1,879,241

UNITED STATES PATENT OFFICE

JOHN W. HILL, OF MILWAUKEE, WISCONSIN, ASSIGNOR OF ONE-HALF TO FRED A. PARSONS, OF MILWAUKEE, WISCONSIN

REFRIGERATED CONTAINER

Application filed June 10, 1929. Serial No. 369,612.

This invention relates to improvements in refrigerated containers.

While the invention is useful for many purposes, the particular embodiment herein illustrated has been designed expressly for the storage of fish by retail merchants.

It is the primary object of the invention to provide a novel and improved refrigerator conveniently adapted for the storage of fish and other perishable commodities in boxed form, under conditions such as to preserve them against the danger of spoiling.

More specifically stated, it is my purpose to provide a device having storage chambers mechanically refrigerated and of such form as to hold the cartons of fish without material loss of space and with a minimum loss of heat. To the latter end my improved device is preferably so designed as to provide a plurality of chambers angularly divergent and directly accessible through a relatively small door provided in their common point, so that the operator may reach straight into any of the plurality of these refrigerated chambers through a single relatively small opening which will not permit of any considerable interchange of air when opened. This feature is deemed of great importance in a device adapted for retail stores, and requiring by its very nature that it be opened frequently.

It is a further important object of the invention to provide an arrangement of refrigerating coils with respect to the refrigerated chambers such as to permit the coils to lie very closely adjacent the chambers, notwithstanding the rectangular cross section of the chambers and the obvious impossibility of bending the coils sharply to a 90° angle at the corners. I accomplish my purpose in this regard by extending the tubing in a general axial direction along each chamber and passing about the corners in a line deviating only slightly from such axial direction. I am enabled thereby to minimize the angular deflection of the tube carrying the refrigerant, and the result is that such tube lies closely adjacent the wall of the chamber at all points.

A valuable incidental result consists in the fact that the refrigerant coil is very closely adjacent each corner of each refrigerated chamber, thereby providing for heat absorption along the line where heat radiation is apt to reach a maximum.

Further objects of the invention are to provide a fish dispensing cabinet containing not only refrigerated containers, but also a set of shelves of which one of the refrigerated containers provides a part; to provide a device of the character described in which there is means for keeping a variety of fish products at the different temperatures suitable for each; and to provide in small and compact form a refrigerating cabinet incorporating a concealed refrigerating unit disposed in a part of the device which would, in any event, be relatively inaccessible.

In the drawing:

Figure 1 is a perspective view of a refrigerated cabinet embodying this invention.

Figure 2 is a fragmentary cross section through the refrigerated portion thereof.

Figure 3 is a fragmentary detail in perspective, of a corner of one of the refrigerated containers, illustrating the application of the tubing for conducting refrigerant thereabout.

Like parts are identified by the same reference characters throughout the several views.

The device comprises a cabinet 5 provided with a set of shelves at 6, of which the top 7 of the cabinet is adapted to comprise the lowermost shelf.

The cabinet is provided with an obliquely disposed wall at 8 to which a door 9 is hinged at 10 giving substantially linear access to each of two refrigerated chambers 15 and 16 disposed substantially at right angles to each other and communicating with each other adjacent the door 9. Chambers 15 and 16 together are the shape of an inverted L in cross section, as will be noted in Figure 2. Chamber 15 may, if desired, be divided by a partition at 17. Each chamber is preferably rectangular in tranverse cross section, and the sizes of the chambers are preferably determined with reference to cartons of fish to be stored therein, so that the completed device will receive such cartons for storage with great economy of space.

The chambers 15 and 16 are carefully insulated against heat loss. The walls of the chambers are completely surrounded by suitable insulation 18 which may, for example, comprise cork or any other suitable insulating material. If cork is used, it will generally be found convenient to apply a layer of cork composition to cover the coils surrounding the chambers, and then to use cork board to fill the remainder of the space provided for insulation.

The door 9 which affords access to both of the refrigerating compartments 15 and 16, may, if desired, be insulated as above described, but is preferably so constructed as to render the interior of the device visible. To this end the door is illustrated as being provided with a pair of spaced glasses 19 through which the contents of the refrigerator may be viewed while being kept cool. For convenience, a pair of clips is provided at 20 which are adapted to support a carton 21 against the lower glass 19 of the door, whereby the advertising matter carried on the carton will be displayed through the door.

There are many kinds of fish marketed in cartons which require temperatures well below freezing for safe keeping. The insulation and arrangement of chambers 15 and 16 adapts them for the storage of such fish at low expense to the retail merchant. Other kinds of sea foods, such as oysters or the like, require temperatures at or near the freezing point so that the perishable products will be kept extremely cold without being frozen. In order to handle such products in the same cabinet used for storing frozen fish, I have provided an oyster pail 25 of porcelain or the like, which is let through an opening in the top or shelf portion 7 of cabinet 5 so that its lower end is exposed to the sub-freezing temperatures prevailing within chamber 16. In order, however, to prevent excessive heat radiation from the pail 25 into chamber 16, I prefer to employ an insulating wall at 26 insuring a predetermined temperature drop between pail 25 and the colder chamber 16. A cover 27 for pail 25 affords ready access to the oysters or other foods stored therein, without requiring that the door 9 be opened.

At the back lower portion of cabinet 5, which is unoccupied by the L shaped disposition of the refrigerating chambers 15 and 16, I provide a compartment 28 which is sufficiently large to receive any standard refrigerating unit such as that designated at 30. The back of this compartment is open as shown at 31 in Figure 2, and the sides thereof are screened as shown at 32 in Figure 1. thus permitting adequate air circulation for the dissipation of heat taken from the refrigerator by the unit. Supplied with electrical current through the cord 33 in the usual manner and controlled by a standard thermostat represented at 34, acting through a switch of the usual form at 35, the unit 30 is adapted to supply refrigerant to a circuit hereinafter to be described, through pipe 36 and to withdraw refrigerant from the system through pipe 37.

As above indicated, it was found impossible to extend the refrigerating coils circuitously about the rectangular cross section of the refrigerating chambers, due to the fact that the copper tubing employed for the coils could not be bent at right angles in conformity with the chamber corners. In order to eliminate this difficulty, the piping 38 was disposed in axially extending runs bent back upon themselves at the ends of the respective areas to be covered by the refrigerating system, as clearly shown in Figures 2 and 3. When any given side wall of one of the refrigerated chambers is covered with a series of runs of pipe to a point adjacent the corner margin 39 of such wall, the pipe is extended thence at a very slight inclination, to the axis of the chamber, whereby to require the entire refrigerated length thereof to pass about its corner as shown at 40 in Figure 3. In this way the deflection of the copper pipe required to traverse the corner is reduced from 90° to a very slight angle indeed.

In operation, the chambers 15 and 16 will be filled with fish or the like requiring extremely low temperatures for keeping it safely. The pail 25 will be used for the storage of foods which do not require such extremely low temperatures. The top 7 of the cabinet, and the shelves 6 extending thereabove will be used for related products which do not require any refrigeration at all for safe keeping. It will be obvious that such a cabinet provides convenient means, not only for safe storage, but for effective display of a complete line of fish.

It is also to be noted particularly that the L shaped disposition of the refrigerated compartments 15 and 16, is such as to provide a relatively small opening closed by the door 9, while the space in compartment 28, which would, most of it, be inaccessible and out of reach of a person striving to gain access from the locality of door 9, is employed for the refrigerating unit. The refrigerating unit, therefore, occupies space which would otherwise be wasted, and the space directly accessibile through door 9 which could practicably be used for the storage of rectangular cartons, is substantially all devoted to such use, the depth of chambers 15 and 16 being approximately the length of the human arm.

It will also be observed that due to the horizontal disposition of refrigerated chamber 16, the bottom thereof as well as the top wall 7 of the cabinet, comprise, in fact, shelves in the same series as the shelves designated by reference character 6, so that my improved device provides unitarily a series of shelves some of which are unrefrigerated and at least one of which is refrigerated.

I claim:

1. A refrigerator provided with a plurality of chambers having their longer center lines angularly divergent and having communicating portions, said chambers being provided with a common door angularly intersecting said center lines at said portions and through which said chambers are substantially linearly accessible.

2. In a device of the character described, the combination with a plurality of angularly divergent refrigerated chambers, of a cabinet enclosing said chambers and provided with an obliquely disposed wall common to said chambers and having an opening through which both chambers are substantially linearly accessible, said wall being provided with a door for said opening.

3. In a device of the character described, the combination with a cabinet provided with a ventilated compartment in its lower rear portion, and a thermally insulated chamber occuping the portion of said cabinet above and in front of said compartment, said cabinet being provided with a ported, obliquely disposed wall at its top front portion, and a door fitted to the port in said wall and adapted to afford access to the thermally insulated chamber in said cabinet.

4. In a device of the character described, the combination with a container having faces angularly joined along their margins, of a tube having convoluted portions flatly associated with contiguous faces of said container, and an interconnecting portion traversing the angular margin between said faces in a direction more closely approaching the direction of said margin than a direction transverse thereto.

5. In a device of the character described, the combination with a container having faces angularly joined along their margins, of a tube having convoluted portions flatly associated with contiguous faces of said container, and an interconnecting portion traversing the angular margin between said faces in a direction more closely approaching the direction of said margin than a direction transverse thereto, and deviating comparatively slightly from the line of said margin.

6. In a device of the character described, the combination with a chamber wall of rectangular cross section, of a pipe closely fitted to said wall and extended on each face thereof in a series of runs extending in the general direction of the angular margins between such faces, one such run being extended about each such angular margin with comparatively slight deviation from the direction of the margin.

7. In a device of the character described, the combination with a plurality of intercommunicating angularly disposed chambers of polygonal cross section, of a pipe traversing the several walls of the several chambers and including a plurality of runs extending forwardly and backwardly along each such wall in the general direction of its margins, the runs on contiguous walls being interconnected by portions of said pipe traversing the intervening angular margin at a direction slightly deviating from the direction of the margin, whereby to avoid sharp angles in said pipe while maintaining said pipe in substantially complete contact with the walls.

8. A refrigerator cabinet comprising a box having in a lower corner portion a ventilated chamber, insulating means positioned to provide a refrigerator compartment extending in front of and over said ventilated chamber in L shaped form in cross section, an intermediate portion of said compartment being provided with a door frame obliquely disposed and a door for said frame through which the horizontal and vertical portions of said compartment are substantially linearly accessible, and a vessel extending through said insulating means to a position for the delivery of heat to said compartment, said vessel having an externally exposed closure through which its contents are accessible without opening said door.

JOHN W. HILL.